United States Patent [19]

Ogawa et al.

[11] Patent Number: 4,842,916

[45] Date of Patent: Jun. 27, 1989

[54] SEPARABLE FASTENER COMPONENT & MOLDINGS ATTACHED WITH SUCH FASTENER COMPONENT

[75] Inventors: Kunihiko Ogawa, Tsurugashima; Yoshio Noguchi, Sakado, both of Japan

[73] Assignee: Kuraray Company Ltd., Kurashiki, Japan

[21] Appl. No.: 140,112

[22] Filed: Dec. 31, 1987

[30] Foreign Application Priority Data

Jan. 19, 1987 [JP] Japan .............................. 62-6688[U]
Jan. 19, 1987 [JP] Japan .............................. 62-6689[U]
Jan. 19, 1987 [JP] Japan .............................. 62-6690[U]
Sep. 9, 1987 [JP] Japan ........................... 62-138531[U]

[51] Int. Cl.$^4$ .............................................. A44B 21/00
[52] U.S. Cl. .................................... 428/100; 428/120; 428/192; 24/444
[58] Field of Search ....................... 428/100, 120, 192; 24/444

[56] References Cited

U.S. PATENT DOCUMENTS

4,563,380  1/1986  Black et al. .......................... 428/100
4,726,975  2/1988  Hatch ................................... 428/100

Primary Examiner—Alexander S. Thomas
Attorney, Agent, or Firm—Oblon, Fisher, Spivak, McClelland & Maier

[57] ABSTRACT

There is provided a hook type separable fastener component which can be integrally attached to various synthetic resin moldings for cushions etc. by a simple operation.

28 Claims, 5 Drawing Sheets

SEPARABLE FASTENER COMPONENT & MOLDINGS ATTACHED WITH SUCH FASTENER COMPONENT

BACKGROUND OF THE INVENTION (1) Field of the Invention

This invention relates to a separable hook and loop type fastener component which can be integrally attached to various synthetic resin moldings for example, moldings for seat cushions and the like.

(2) Description of the Related Art

The hook and loop type fasteners have thus far been in wide use for joining textile fabrics and other various items. For instance, it is known to attach one component of the loop and hook fastener to a predetermined position on the surface of a cushion body and attach the other component to a corresponding position on the back side of a cover material, fixing the latter on the cushion body by engagement of the two fastener components. In this method, one fastener component is attached to the cushion body surface by: (i) a method of forming a fastener component by attaching a non-woven fabric sheet to the back side of a fastener strip with hook-like coupling elements, setting the fastener component in a sealed state within a mold by the use of an adhesive, and introducing a foamable material into the mold for foaming the same therein (cf. Japanese Laid-Open Patent Application No. 59-184599); or (ii) a method of covering a protective metal sheet on hook-like coupling elements of a fastener component having a thin metal sheet, fixing the fastener component in a mold by magnetic attraction, and introducing a foamable material into the mold to fix the fastener component integrally on the molded body (cf. EP No. 0145603).

Of the above-mentioned methods for attaching a fastener component to a cushion body, the method (i) of fixing a fastener component in a mold by the use of an adhesive is often found troublesome in addition to the difficulty which is experienced in adjusting the fastener mounting position. On the other hand, the method (ii), which covers the whole hook-like coupling elements with a protective film, has a marked effect in preventing intrusion of the molding material into spaces between the individual coupling elements during the molding process, but it involves a laborious job of removing the protective film from the hook-like coupling elements after ejection of the molded article from the mold. Additionally, it has a drawback that the fastening force of the hook-like coupling elements is lowered by existence of unfused film residues in case of a film which is thermally fusible on foaming the molding material.

OBJECT OF THE INVENTION

Under these circumstances, it is an object of the present invention to provide a separable fastener component which can prevent intrusion of a molding material into the spaces between the individual hook-shaped coupling elements easily without requiring the laborious job of fixing the fastener component in a sealed state within a mold, which can obviate the necessity for removing the protective film from the hook-like mating elements, and which is free of the drop in coupling force a caused by residual substances which remain on the hook-like coupling elements after fusion of the film.

SUMMARY OF THE INVENTION

In accordance with the present invention, there is provided a hook and loop type fastener component to be attached to plastic moldings, which is constituted by: an elongated fastener strip having hook-like coupling elements on the front side of a base; an anchor member provided on the back side of the fastener strip; longitudinal edge portions void of the hook-like coupling elements and provided along longitudinal side edges of the fastener strip; a barrier member provided on the front side (on the side of the hook-like coupling elements) of the longitudinal edge portion by applying thereto a bunch of fiber or a synthetic resin material in a height not greater than twice the height of the hook-like coupling elements.

In a case where the fastener component according to the invention is directly molded on an article in a molding process thereof, it becomes possible not only to omit the laborious job of removing the residual films from the coupling elements which are embedded on the moldings, but also to preclude the drop of coupling force which is attributable to the residual substances of the film.

DESCRIPTION OF THE PREFERRED EMBODIMENTS

The hook-like coupling elements to be provided on the front side of the base of the fastener component according to the present invention may be of mushroom, hook, or umbrella shape or of any shape as long as they have coupling and uncoupling functions. (All such shapes are hereinafter referred to generally as "hooks" or "hook-like coupling elements.") For example, the hook-like coupling elements can be formed by clipping side portions of nylon, polyester, or any other synthetic fiber monofilament loops which are woven into substrate cloth as subsidiary warps in the weaving process to form upstanding loops on the surface of the substrate cloth, or by forming the hook-like coupling elements integrally with the base by the use of a synthetic resin material.

The fastener component according to the present invention essentially includes a barrier member which is formed of a bunch of fiber or a synthetic resin material, and applied to a marginal edge portion on the front side (on the side of the hook-shaped coupling elements) of the hook and loop fastener component in a height not greater than twice the height of the hook-like coupling elements to prevent intrusion of a molding material. In the fastener component according to the invention, the barrier member may consist of a sheet-like strip or at least a ridge-like protuberance with a smaller width than the longitudinal edge portions. The sheet-like strip may protrude beyond the longitudinal edge portions.

In the present invention, the bunch of fiber may consist of combed fiber or randomly laminated fiber. More specifically, besides multifilament loops and non-woven fabric, it may consist of, for example, tow, sliver, roving, thick yarns, bulky yarns, or the like. However, use of non-woven fabric is most recommended. The multifilament loops may consist of a multifilament of synthetic fiber such as polyester, polypropyrene, polyacrylonitrile, nylon, rayon, and the like, or natural fiber such as cotton, hard and bast fibers, which is woven into loops in the longitudinal edge portions of the fastener strip when weaving the hook-like coupling elements on the front side of the substrate fabric. Examples of the material for the non-woven fabric include cotton, rayon staples, acetate, nylon, and polyester, which may be used singly or in combination. With regard to the shape of the non-woven fabric, it may be a flat strip extending horizontally along each longitudinal edge portion of the fastener strip, or it may be in the form of a ridge provided along the longitudinal edge portion a height substantially the same as that of the hook-like coupling elements. Alternatively, in a case where non-woven fabric is used as an anchor member on the back side of the fastener strip, one may use a non-woven fabric which is wider than fastener strip, folding the protruded portion of the fabric toward the hook-like coupling elements to facilitate the manufacturing process. The non-woven fabric can be attached to the longitudinal edge portions of the tape fastener by the use of ultrasonic or high frequency stitching, hot melt adhesive, double-face adhesive tape, or other suitable means.

In the present invention, the synthetic resin material which is applied on the front side of the longitudinal edge portion of the fastener strip can serve as a barrier member against intrusion of the molding material. The plastics barrier may be of a sheet-like form or at least a ridge with a width smaller than the longitudinal edge portion. In case the synthetic resin is in a sheet-like form, it may protrude beyond the marginal edges of the tape fastener. More specific examples of the sheet-like plastics include thin sheets of foamed resins such as polyurethane and films of polyethylene, cellulose acetate, and the like, while specific example of the ridge-forming plastics include strips of foamed resins. These thin foamed resin sheets, films, and foamed resin strips can be attached to the marginal edge portion of the tape fastener by means of ultrasonic or high frequency stitching, hot melt adhesive, double-face adhesive tape, or other suitable means.

Other examples of the barrier ridge of plastics include ridges of hot-melt type resins, which are formed by applying ethylene-vinyl acetate copolymers, polyamide base resins, polyester base resins, styrene base rubber, and the like to the longitudinal edge portions of the fastener strip.

In case the separable fastener strip is integrally formed from plastics or the like, the fiber bunch or the ridge of plastics is attached to the longitudinal edge portions of the fastener strip by suitable means.

The bunch of fiber or the applied synthetic resin material functions to block the molding material which would otherwise tend to exude into spaces between inner wall surfaces of the mold and the marginal edge portion of the tape fastener and bury the hook-like coupling elements. The multifilament loops, non-woven fabric, and foamed resin which are exemplified above as a fiber bunch or a foamed synthetic resin material for the barrier have properties of absorbing the molding material which is charged into the mold, hardening together with the absorbed molding material, and acting as a barrier to block the molding material which tends to intrude into the spaces between the mold and the marginal edge portion of the tape fastener. Besides, the lamination of a hot melt type resin, which is exemplified as a synthetic resin for the barrier, has a greater effect of blocking intrusion of the molding material into grooves in the mold as it is softened by heat in the molding process, sealing the gap spaces between the mold and the fastener component.

The anchor member of the fastener component according to the invention may be of any structure as long as it can be wedged in the molded body, for example, it may consists of fixed elements of mushroom, hook or umbrella shape, a multitude of projecting monofilament or multifilament loops, or non-woven fabric. These materials for the anchor member can be attached to the back side of the fastener strip by ultrasonic or high frequency stitching, hot-melt type adhesive, double-face adhesive tape or other suitable means.

In the fastener component according to the invention, the anchor member may be formed integrally with the fastener strip, for example, by a weaving method or a plastic molding method. A fastener component which has the anchor member woven integrally with the hook and loop fastener has an advantage that it can be formed in a reduced thickness to increase its adaptability to molds with sloped configurations. The anchor members useful for this purpose include, for example, fixed elements of mushroom, hook or umbrella shape, and a multitude of uprising monofilament or multifilament loops. In a case where the anchor member is formed by weaving a multitude of uprising monofilament loops, for example, one can obtain a fastener component which has the anchor member woven integrally with the hook and loop fastener, by weaving the monofilament loops on the rear side of the substrate cloth of the fastener strip simultaneously with weaving of the multifilament loops for the hook-like coupling elements in the marginal edge portion on the front side of the substrate cloth.

The separable hook and loop type fastener component according to the invention may include a magnetic metal strip which is interposed between the hook and loop fastener and the anchor member. This magnetic metal strip is attracted by a magnet which is located at the bottom of the mold to facilitate situation and positioning of the fastener component in the mold. In case the anchor member is formed integrally with the hook and loop fastener, it suffices to position the metal plate in the part of the fastener portions where the anchor member is provided.

After positioning the fastener component of the invention in a mold, a molding material is introduced into the mold cavity and heat is applied to the mold to cure the material to shape. Examples of useful molding materials include polyurethane, polystyrene, polyvinyl chloride, polyolefin, polyester, polyamide, synthetic rubber, and the like. The molding material may be charged into the mold in a liquid, granular, or powdery form whichever is suitable.

The molded object with a molded-in fastener component has the hook-like coupling elements exposed on its surface, so that it can be joined to other objects with loops for various purposes. To give an example of application, a separable fastener component is embedded on a polyurethane foam during the molding process, and a cover or skin material with non-woven fabric, napped surface, or loop-like fiber on its rear side is fixed on the molded body by engagement with the fastener component in the production of seat cushions and chairs.

Now, the invention is described with reference to the accompanying drawings.

Figure 1:
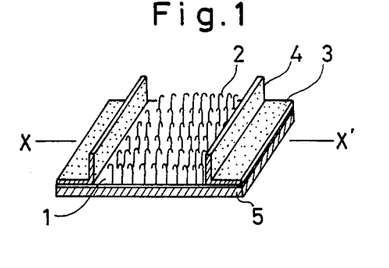
FIG. 1 is a perspective view of a hook type separable fastener component according to the invention.
Figure 2:
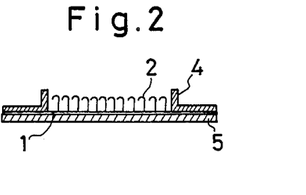
FIG. 2 is a sectional view taken on line II—II of FIG. 1.
Figures 3A, 3B:
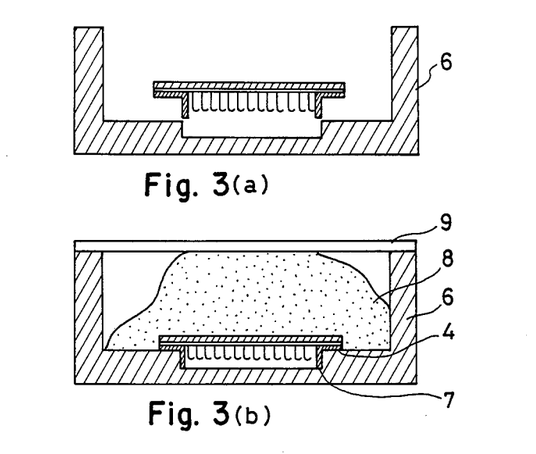
FIGS. 3(a) and 3(b) are sectional view of the fastener component set in a mold, showing the fastener component in two different stages of the molding process, namely, before and after charging a molding material.
Figure 4:
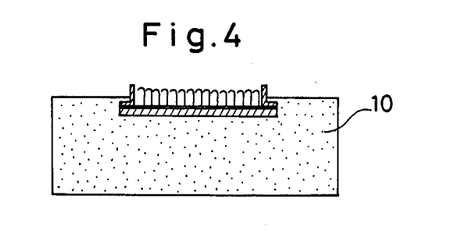
FIG. 4 is a sectional view of a molded body having the fastener component embedded on its surface.
Figure 5A:
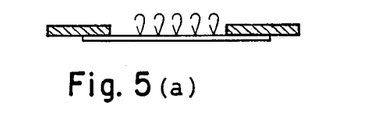
FIGS. 5(a) through 5(e) are diagrammatic views of various barrier members of non-woven cloth mounted on the longitudinal edge portions of the fastener tape or strip.
Figure 5B:
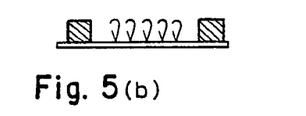
Figure 5C:
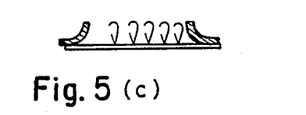
Figure 5D:
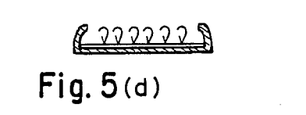
Figure 5E:
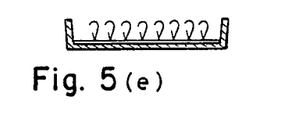

Shown in perspective view in FIG. 1 is a separable fastener component of the invention, including a multitude of hook-like coupling elements 2 provided on the front side of a substrate cloth 1, barrier members 4 of non-woven fabric provided on and along longitudinal edge portions 3 of the fastener strip, and an anchor member 5 provided on the back side of the substrate cloth 1. FIG. 2 is a sectional view taken on line II—II of FIG. 1. FIG. 3(a) is a sectional view of the fastener component of FIG. 1 which is placed in a mold 6. As shown in FIG. 3(b), the hook-like coupling elements are faced toward the bottom surface of a groove 7 which is provided in the mold 6, positioning the barrier members 4 of non-woven cloth along the side edges of the groove. Then, a molding material 8 is charged into the mold 6, and a lid 9 is closed to foam the charged material. In this foaming stage, the barrier members 4 of non-woven cloth absorb the molding material and seal the side edges of the groove 7 to prevent the same from entering the groove 7. FIG. 4 shows in section the fastener component which is integrally and securely embedded on a molded body 10.

FIGS. 5(a) to 5(e) are diagrammatic views of various non-woven fabric barriers which are mounted in different positions on the marginal edge portions of the fastener tape.

Figure 6:
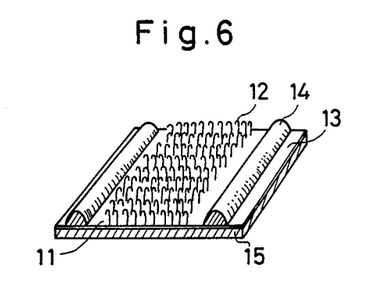
FIGS. 6 to 9 are perspective views of modifications of the hook type separable fastener component according to the invention.
Figure 7:
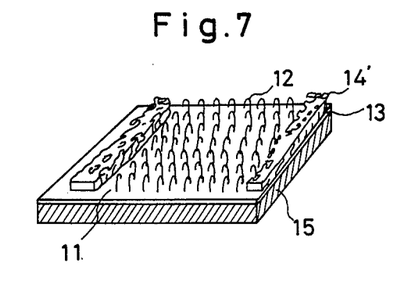
Figure 8:
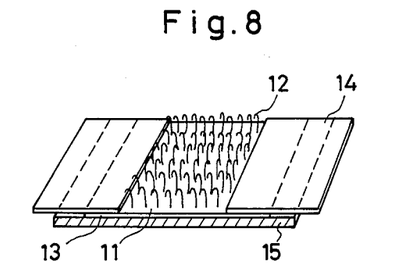

FIG. 6 is a perspective view of a fastener component which is provided with banks of hot melt type synthetic resin along the marginal edges of the fastener strip. FIG. 7 is a perspective view of a fastener component which is provided with strips of foamed resin along the marginal edges of the fastener tape. FIG. 8 is a perspective view of a fastener component which is provided with films which are protruded outwardly beyond the longitudinal side edges of the fastener strip.

Figure 9:
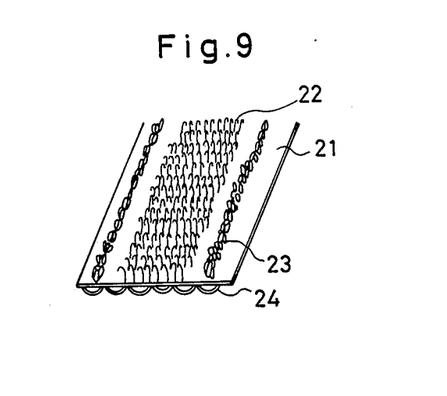

FIG. 9 is a perspective view of a fastener component with hook-like coupling elements 22 provided on the front side of a substrate cloth 21, multifilament loops 23 provided in the marginal edge portions, and monofilament loops 24 provided on the back side of the substrate cloth 21.

EXAMPLES

The invention will be illustrated more particularly by the following examples.

EXAMPLE 1

There was prepared a hook type separable fastener component having hook-like polyester monofilament coupling elements on an elongated 25 mm wide polyester fastener strip at a rate of 30 hooks/cm$^2$, an anchor member having nylon 66 monofilament loops at a rate of 9 loops/cm$^2$, and a 35 mm wide substrate cloth of polyester fiber. Longitudinal edge portions void of the hook-like coupling elements were provided along the longitudinal side edges of the fastener strip, and 3 mm thick and 8 mm wide strips of non-woven cloth were attached to the marginal edge portions. The hook type fastener component was placed in a groove 7 of a mold 6 as shown in FIG. 3, with the hook side of the fastener facing toward the mold wall surface. Then, 100 parts by weight (hereinafter referred to simply as "parts" for brevity) of glycerine base triole polyether (ADK-POLYETHER G-3000B, a product of Asahi Denka Kogyo Co.), 0.15 part of an amine base catalyst (DABCO, a product of Sankyo Air Products Co.), 1.4 parts of a silicon base dispersant (L-540, a product of Japan Unicar Co.), 10 parts of dichloromethane serving as a foaming agent, and 3 parts of water were mixed in a mixing vessel. Further, after admixing 0.25 part of a tin base catalyst (T-9, a product of M & T Chemical Co.) (a solution of T-9/G-3000B=25/75), 40 parts of TDI (tolylenediisocyanate) was added and stirred for 10 seconds at room temperature to prepare a polyurethane foaming stock. This polyurethane foaming stock was charged into the mold, and the lid 9 of the mold 6 was closed, letting it stand at room temperature for 20 minutes. Then, the lid 9 was removed and, after leaving for further 15 minutes, the molding was ejected. The barriers of non-woven fabric on the marginal edge portions of the fastener tape sealed the edge portions of the groove 7 satisfactorily and blocked inflows of the foaming stock which otherwise would have buried the hook elements 2 of the fastener component. The non-woven fabric absorbed the foaming stock sufficiently, and securely joined to the foam. A cover material with a multitude of fiber loops on its back side was put and pressed on the molded foam, whereupon the loops of the cover material enaged with the hook elements of the molded-in fastener component, fixing the cover material on the foam in a form suitable for use as a cushion.

EXAMPLE 2

Figure 10:
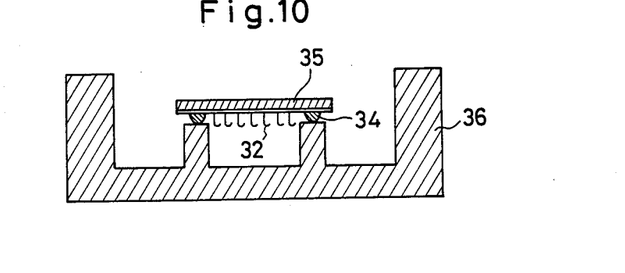
FIG. 10 is a sectional view of the fastener component which is set in a mold in Example 2.
Figure 11:
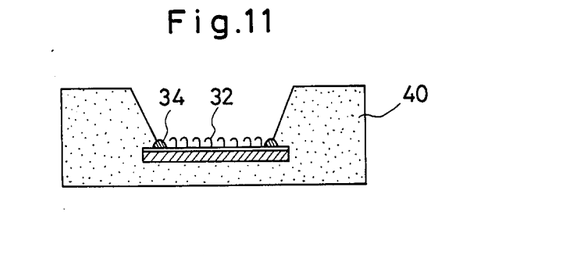
FIG. 11 is a sectional view of the foam molding obtained by the method of Example 2.

There was prepared a separable hook type fastener component having polyester monofilament hook-like coupling elements on a 25 mm wide polyester fastener strip at a rate of 30 hooks/cm$^2$, an anchor member having nylon 66 monofilament loops at a rate of 9 loops/cm$^2$, and a 25 mm wide polyester fiber substrate, 2.5 mm wide longitudinal edge portions void of the hook-like coupling elements, and barrier banks formed by applying a hot melt type resin (Styrene base S-Dine #9131, a product of Sekisui S-Dine Co.) at a rate of 33 g/m by the use of an applicator (Foam Melt Applicator FM-151 of Nordson Co.) and foaming the resin at a magnification rate of 2.1 into a semi-circular shape of 3.0 mm×3.0 mm. This fastener component was set in a groove at the bottom of a mold of the shape as shown in FIG. 10, and the fastener component was integrally embedded on the molded foam by the same method and procedures as in Example 1. (FIG. 11) The ridge-like barriers of the hot melt resin provided along the longitudinal edge portions satisfactorily sealed the edges of the groove in the mold, preventing the foaming stock from covering the hook-like coupling elements. Further, the ridge-like banks securely bonded to the foam, without delamination of the foam portion which covered the marginal edge portions of the fastener tape. Upon pressing the rear side of a cover material with a multitude of fiber loops against the foam, the loops on the rear side of the cover material interlocked with the hook elements of the fastener component, forming a cushion with a deeply depressed shape.

EXAMPLE 3

There was prepared a hook type fastener component having polyester monofilament hook-like coupling elements on an elongated 25 mm wide fastener strip of polyester at a rate of 30 hooks/cm$^2$, an anchor member having nylon 66 monofilament loops at a rate of 9 loops/cm$^2$, and a 25 mm wide polyester fiber substrate for supporting the fastener tape, longitudinal edge portions void of the hook-like coupling elements, and 3 mm thick and 10 mm wide soft low density urethane slab sheets bonded to the longitudinal edge portions by the use of an adhesive.

The fastener component was set in a groove within a mold same as in Example 2, and integrally embedded on a molded foam body by the same method and procedures as in Example 1.

The urethane slab sheets provided on the marginal edge portions absorbed the molding material sufficiently and securely joined to the molded body, preventing the molding material from flowing into the groove of the mold and covering the hook elements.

EXAMPLE 4

There was prepared a fastener component having hook-like coupling elements provided on the front side of substrate cloth, polyester multifilament (150 denier-32 filaments) loops woven on the marginal edge portions, and nylon 66 monofilament loops woven on the rear side of the substrate cloth, the hook elements and anchor member being woven integrally with each other.

Figure 12:
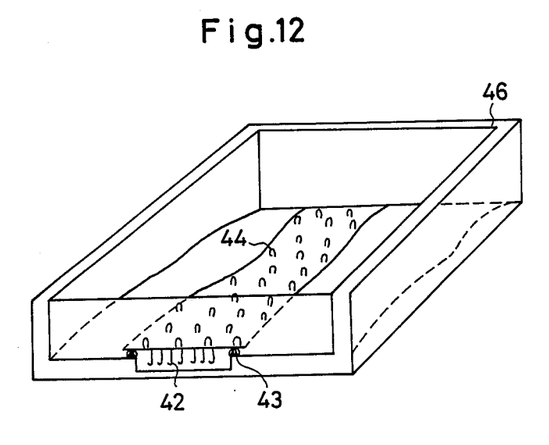
FIG. 12 is a diagrammatic view of the fastener component which is set in a mold in Example 4.

The fastener component was set in a mold groove with a sloped surface configuration, facing the hook side of the fastener toward the mold wall surface (FIG. 12), and an urethane foam having the fastener component integrally embedded thereon was produced by the same method and procedures as in Example 1.

The multifilament loops on the longitudinal edge portions were set together with soaked molding material, and the hook-like coupling elements were integrally embedded on the surface of the molded body in exposed state without being covered with the molding material.

Upon overlaying on the molded foam a cover material with a multitude of fiber loops on its rear side, the latter was fixed on the sloped surface of the foam by engagement of the loops with the hook elements of the fastener component, forming a seat cushion suitable for use.

What is claimed is:

1. A separable fastener component suitable for attachment to plastic moldings, said separable fastener component comprising:
   (a) an elongated fastener strip having hook-shaped coupling elements on the front side of a base;
   (b) an anchor member provided on the rear side of said elongated fastener strip;
   (c) longitudinal edge portions void of said hook-shaped coupling elements provided along the opposite longitudinal side edges of said elongated fastener strip;
   (d) a barrier member formed on and along each longitudinal edge portion by applying a bunch of fiber in a height not greater than twice the height of said hook-shaped coupling elements, said bunch of fiber being in the form of non-woven cloth.

2. The separable fastener component of claim 1, wherein said barrier members are sheet-shaped structures.

3. The separable fastener component of claim 2, wherein said sheet-shaped barrier members protrude beyond said longitudinal edge portions.

4. The separable fastener component of claim 1, wherein said barrier members are ridge-shaped structures having a smaller width than said longitudinal edge portions.

5. The separable fastener component of claim 1, wherein said anchor member comprises fixed elements of mushroom, hook, or umbrella shape, monofilament loops, multifilament loops, or non-woven cloth.

6. The separable fastener component of claim 1, wherein a metal sheet is interposed between said elongated fastener strip and said anchor member.

7. The separable fastener component of claim 6, wherein said metal sheet is provided on the rear side of said elongated fastener strip in a part where said anchor member is present.

8. The separable fastener component of claim 1, wherein said anchor member is formed integrally with said elongated fastener strip.

9. The separable fastener component of claim 8, wherein said anchor member comprises fixed elements of mushroom, hook, or umbrella shape, or a multitude of uprising monofilaments or multifilament loops.

10. A separable fastener component suitable for attachment to plastic moldings, said separable fastener component comprising:
    (a) an elongated fastener strip having hook-shaped coupling elements on the front side of a base;
    (b) an anchor member provided on the rear side of said elongated fastener strip;
    (c) longitudinal edge portions void of said hook-shaped coupling elements provided along the opposite longitudinal side edges of said elongated fastener strip;
    (d) a barrier member formed on and along each longitudinal edge portion by applying a bunch of fiber in a height not greater than twice the height of said hook-shaped coupling elements, said bunch of fiber being formed of multifilament loops.

11. The separable fastener component of claim 10, wherein said barrier members are sheet-shaped structures.

12. The separable fastener component of claim 11, wherein said sheet-shaped barrier members protrude beyond said longitudinal edge portions.

13. The separable fastener component of claim 10, wherein said barrier members are ridge-shaped structures having a smaller width than said longitudinal edge portions.

14. The separable fastener component of claim 10, wherein said anchor member comprises fixed elements of mushroom, hook, or umbrella shape, monofilament loops, multifilament loops, or non-woven cloth.

15. The separable fastener component of claim 10, wherein a metal sheet is interposed between said elongated fastener strip and said anchor member.

16. The separable fastener component of claim 15, wherein said metal sheet is provided on the rear side of said elongated fastener strip in a part where said anchor member is present.

17. The separable fastener component of claim 10, wherein said anchor member is formed integrally with said elongated fastener strip.

18. The separable fastener component of claim 17, wherein said anchor member comprises fixed elements of mushroom, hook, or umbrella shape, or a multitude of uprising monofilament or a multifilament loops.

19. A separable fastener component suitable for attachment to plastic moldings, said separable fastener component comprising:
   (a) an elongated fastener strip having hook-shaped coupling elements on the front side of a base;
   (b) an anchor member provided on the rear side of said elongated fastener strip;
   (c) longitudinal edge portions void of said hook-shaped coupling elements provided along the opposite longitudinal side edges of said elongated fastener strip;
   (d) a barrier member formed on and along each longitudinal edge portion by applying a synthetic resin material in a height not greater than twice the height of said hook-shaped coupling elements, said synthetic resin material being a foamed material.

20. The separable fastener component of claim 19, wherein said synthetic resin material is a hot melt resin.

21. The separable fastener component of claim 19, wherein said barrier members are sheet-shaped structures.

22. The separable fastener component of claim 21, wherein said sheet-shaped barrier members protrude beyond said longitudinal edge portions.

23. The separable fastener component of claim 19, wherein said barrier members are ridge-shaped structures having a smaller width than said longitudinal edge portions.

24. The separable fastener component of claim 19, wherein said anchor member comprises fixed elements of mushroom, hook, or umbrella shape, monofilament loops, multifilament loops, or non-woven cloth.

25. The separable fastener component of claim 19, wherein a metal sheet is interposed between said elongated fastener strip and said anchor member.

26. The separable fastener component of claim 25, wherein said metal sheet is provided on the rear side of said elongated fastener strip in a part where said anchor member is present.

27. The separable fastener component of claim 19, wherein said anchor member is formed integrally with said elongated fastener strip.

28. The separable fastener component of claim 27, wherein said anchor member comprises fixed elements of mushroom, hook, or umbrella shape, or a multitude of uprising monofilament or multifilament loops.

* * * * *